United States Patent
Smith et al.

(10) Patent No.: US 10,773,493 B2
(45) Date of Patent: Sep. 15, 2020

(54) IMAGE CONTAINING LAMINATE

(71) Applicant: Hewlett-Packard Development Company, L.P., Houston, TX (US)

(72) Inventors: Greg S Smith, Oceanside, CA (US); David R Parry, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 202 days.

(21) Appl. No.: 16/064,179

(22) PCT Filed: Apr. 7, 2016

(86) PCT No.: PCT/US2016/026394
§ 371 (c)(1),
(2) Date: Jun. 20, 2018

(87) PCT Pub. No.: WO2017/176270
PCT Pub. Date: Oct. 12, 2017

(65) Prior Publication Data
US 2019/0001622 A1    Jan. 3, 2019

(51) Int. Cl.
*B32B 7/12* (2006.01)
*B32B 27/06* (2006.01)
(Continued)

(52) U.S. Cl.
CPC ............. *B32B 7/12* (2013.01); *A45D 29/001* (2013.01); *B32B 7/04* (2013.01); *B32B 7/06* (2013.01);
(Continued)

(58) Field of Classification Search
CPC ... B32B 2307/748; B32B 27/12; B32B 27/06; B32B 2262/08; B32B 2307/402;
(Continued)

(56) References Cited

U.S. PATENT DOCUMENTS 5,681,631 A    10/1997  Steelman et al.
5,851,614 A *  12/1998  Buck ........................ B41M 3/12
                                                        428/40.1
(Continued)

FOREIGN PATENT DOCUMENTS

CN      100536716           9/2009
EP        1044821 A2 *    10/2000  .......... B41M 7/0027
(Continued)

OTHER PUBLICATIONS

Hanlon, M., 'NailJet Pro Inkjets Any Image onto Fingernails,' (Web Page), Jul. 10, 2005, URL: http//www.gizmag.com/go/4260/ ~6 pages.

*Primary Examiner* — Vishal I Patel
(74) *Attorney, Agent, or Firm* — HP Inc. Patent Department

(57) ABSTRACT

One example provides a method. The method includes printing an image on a surface of laminate, the laminate including: a backing layer; and a transparency disposed over the backing layer. The transparency may have a first side having the image printed thereon and a second side disposed over a first side of the backing layer, the second side opposite the first side. The method may include detaching the second side of the transparency from the first side of the backing layer and reattaching the first side of the transparency to the first side of the backing layer to form a laminated image. The method may include disposing the laminated image over a substrate surface having a curvature.

14 Claims, 4 Drawing Sheets

(51) Int. Cl.
B32B 38/14 (2006.01)
A45D 29/00 (2006.01)
B44C 1/17 (2006.01)
B32B 27/12 (2006.01)
B32B 27/20 (2006.01)
B32B 27/34 (2006.01)
B32B 27/28 (2006.01)
B32B 27/08 (2006.01)
B32B 7/06 (2019.01)
B32B 27/36 (2006.01)
B32B 21/08 (2006.01)
B32B 25/08 (2006.01)
B32B 27/30 (2006.01)
B32B 7/04 (2019.01)
B32B 25/12 (2006.01)
B32B 25/14 (2006.01)
B32B 27/32 (2006.01)
B32B 27/10 (2006.01)
B32B 38/10 (2006.01)

(52) U.S. Cl.
CPC .............. *B32B 21/08* (2013.01); *B32B 25/08* (2013.01); *B32B 25/12* (2013.01); *B32B 25/14* (2013.01); *B32B 27/06* (2013.01); *B32B 27/08* (2013.01); *B32B 27/10* (2013.01); *B32B 27/12* (2013.01); *B32B 27/20* (2013.01); *B32B 27/28* (2013.01); *B32B 27/281* (2013.01); *B32B 27/283* (2013.01); *B32B 27/304* (2013.01); *B32B 27/32* (2013.01); *B32B 27/34* (2013.01); *B32B 27/36* (2013.01); *B32B 27/365* (2013.01); *B32B 38/14* (2013.01); *B44C 1/17* (2013.01); *B32B 38/10* (2013.01); *B32B 2250/02* (2013.01); *B32B 2250/03* (2013.01); *B32B 2250/05* (2013.01); *B32B 2255/10* (2013.01); *B32B 2255/205* (2013.01); *B32B 2255/26* (2013.01); *B32B 2262/0253* (2013.01); *B32B 2262/0269* (2013.01); *B32B 2262/08* (2013.01); *B32B 2262/10* (2013.01); *B32B 2262/101* (2013.01); *B32B 2262/106* (2013.01); *B32B 2270/00* (2013.01); *B32B 2307/402* (2013.01); *B32B 2307/406* (2013.01); *B32B 2307/41* (2013.01); *B32B 2307/412* (2013.01); *B32B 2307/546* (2013.01); *B32B 2307/732* (2013.01); *B32B 2307/748* (2013.01); *B32B 2457/00* (2013.01); *B32B 2457/20* (2013.01); *B32B 2457/202* (2013.01); *B32B 2571/00* (2013.01); *B32B 2605/00* (2013.01)

(58) Field of Classification Search
CPC ....... B32B 2571/00; B32B 7/04; B32B 25/08; B32B 38/14; B32B 27/283; B32B 2262/0269; B32B 2457/202; B32B 2307/546; B32B 27/281; B32B 2250/03; B32B 2457/00; B32B 2262/101; B32B 2255/205; B32B 2262/0253; B32B 2605/00; B32B 25/14; B32B 27/10; B32B 27/28; B32B 27/20; B32B 7/06; B32B 27/36; B32B 2307/41; B32B 27/365; B32B 2307/732; B32B 7/12; B32B 38/10; B32B 2250/05; B32B 2255/26; B32B 2250/02; B32B 27/304; B32B 25/12; B32B 21/08; B32B 2270/00; B32B 2262/106; B32B 2307/412; B32B 2457/20; B32B 27/32; B32B 27/08; B32B 2307/406; B32B 27/34; B32B 2255/10; B32B 2262/10; A45D 29/001; B44C 1/17
See application file for complete search history.

(56) References Cited

U.S. PATENT DOCUMENTS

| | | | |
|---|---|---|---|
| 6,067,996 | A | 5/2000 | Weber et al. |
| 6,286,517 | B1 | 9/2001 | Weber et al. |
| 6,866,382 | B2 | 5/2005 | Quintana et al. |
| 7,377,634 | B2 | 5/2008 | Quintana et al. |
| 7,861,730 | B2 | 1/2011 | Jordan |
| 8,925,557 | B2 | 1/2015 | Liao |
| 2002/0029843 | A1 | 3/2002 | Popat et al. |
| 2012/0222804 | A1* | 9/2012 | Liang .................... B44C 1/1733 156/230 |
| 2013/0017352 | A1 | 1/2013 | Chang |

FOREIGN PATENT DOCUMENTS

| | | | |
|---|---|---|---|
| EP | 2774506 | 1/2015 | |
| GB | 2362852 A | * 12/2001 | ............ B32B 38/14 |

* cited by examiner

IMAGE CONTAINING LAMINATE

BACKGROUND

Inkjet printers may be cost-effective devices for producing color images. In some instances, the quality of color prints made by inkjet printers has advanced to a level such that photo-quality images may be produced. To this end, special print media, or "photo media," have been developed. A photo medium usually comprises a base of white, plastic film, or bonded layers of plastic and paper. One or both sides of the base may be coated with a thin, ink-receiving coating. This ink-receiving coating may provide the photographic attributes of the medium.

BRIEF DESCRIPTION OF THE DRAWINGS

The drawings are provided to illustrate various examples of the subject matter described herein related to an image containing laminate and methods related to same, and are not intended to limit the scope of the subject matter. The drawings are not necessarily to scale.

DETAILED DESCRIPTION

Figure 1:
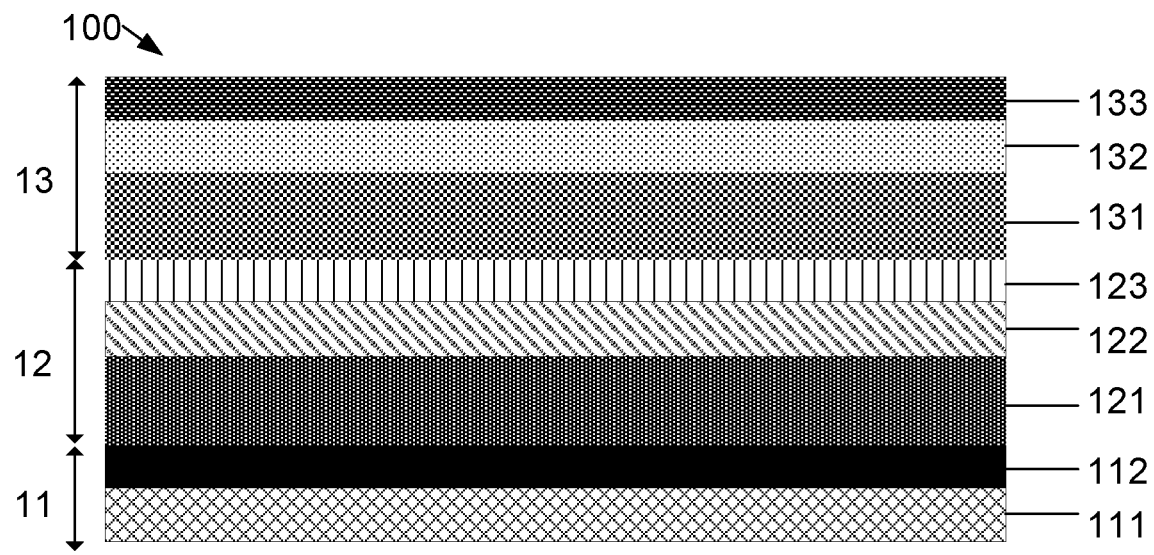
FIGS. 1A-1B show schematics of an example laminate and an example laminated image, respectively, as described herein.
Figure 1:
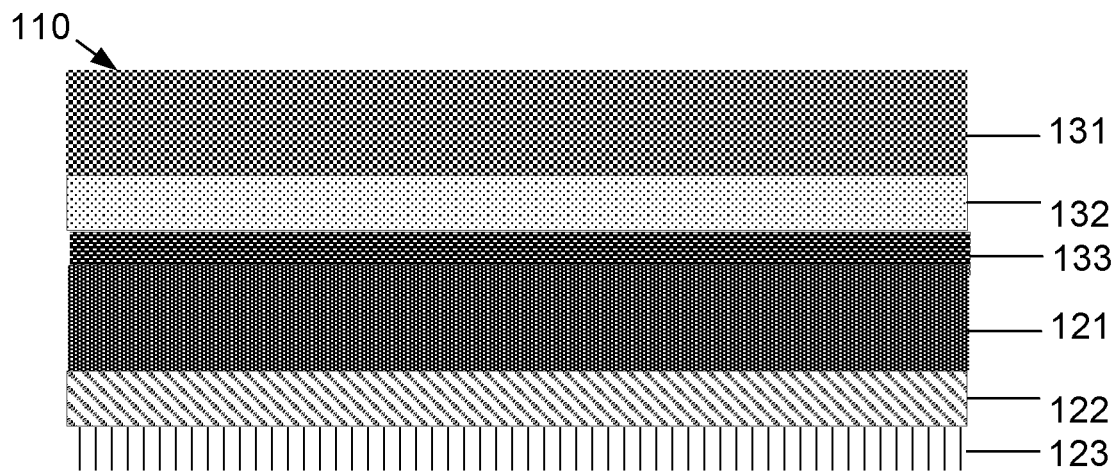

Transferring a printed image from one substrate to another may be challenging, particularly when then latter substrate has a curvature and/or is small. One example of such a substrate is finger nail. Three issues with pre-existing nail appliques may include high cost, lack of image customization and/or fidelity, and keratin (skin, fingernail) safety and hygiene.

In view of the aforementioned challenges related to the transfer of inkjet printed images, the Inventors have recognized and appreciated the advantages of an image containing laminate as described herein. Following below are more detailed descriptions of various examples related to an image containing laminate and methods related to same. In one example, the methods involve a reverse-print transparency and involve a multilayer composite laminate compatible with consumer inkjet printers. The various examples described herein may be implemented in any of numerous ways.

Provided in one aspect is a method comprising: printing an image on a surface of a laminate, the laminate comprising: a backing layer; and a transparency disposed over the backing layer, wherein the transparency has a first side having the image printed thereon and a second side disposed over a first side of the backing layer, the second side opposite the first side; detaching the second side of the transparency from the first side of the backing layer and reattaching the first side of the transparency to the first side of the backing layer to form a laminated image; and disposing the laminated image over a substrate surface having a curvature.

Provided in another aspect is a method comprising: printing an image on a surface of a laminate, the laminate comprising: a disposable liner; a backing layer disposed over the liner; and a transparency disposed over the backing layer, wherein the transparency has a first side having the image printed thereon and a second side disposed over a first side of the backing layer, the second side opposite the first side; detaching the disposable liner from the backing layer; detaching the second side of the transparency from the first side of the backing layer and reattaching the first side of the transparency to the first side of the backing layer to form a laminated image; and disposing the laminated image over a substrate surface having a curvature.

Provided in another aspect is an article comprising a laminate, comprising: a disposable liner, comprising a disposable paper liner, and a silicone release layer disposed over the paper liner; a backing layer disposed over the disposable liner, the backing layer comprising a first adhesive layer; an opaque polymeric film disposed over the first adhesive layer; and a second adhesive layer disposed over the opaque polymeric film; and a transparency having the image printed thereon and disposed over the backing layer, a second side of the transparency disposed over a first side of the backing layer, wherein the transparency comprises a release layer on the second side; a transparent polymeric film disposed over the release layer; and a top layer on a first side of the transparency comprising the image and disposed over the transparent polymeric film, the first side opposite the second side.

To the extent applicable, the terms "first," "second," "third," etc. herein are merely employed to show the respective objects described by these terms as separate entities and are not meant to connote a sense of chronological order, unless stated explicitly otherwise herein.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

FIG. 1A provides a schematic illustrating an article showing an example laminate described herein. In this example, the laminate 100 comprises a disposable liner 11, a backing layer 12 disposed over the disposable liner, and a transparency 13 having the image printed thereon and disposed over the backing layer. It is noted that the laminate need not comprise only the three layers as shown in FIG. 1A and instead may comprise any suitable number of layers in any suitable configuration. For example, the relative locations of these layers may vary. Also, a laminate need not comprise all three layers and may comprise, for example, only two of these layers. Additionally, each of these layers may comprise at least one sub-layer, as described further below.

The disposable liner 11 may comprise a disposable paper liner 111 and a release layer 112 disposed over the paper liner. The disposable paper liner 111 may be used once or may be used multiple times before being disposed of. The disposable paper liner 111 may comprise any suitable material. The disposable paper liner 111 may comprise a natural material, a synthetic material, or both. For example, the disposable paper liner 111 may comprise at least one of cellulosic paper, polyethylene terephthalate ("PET"), polypropylene, polyethylene, polycarbonate, polyimide, polyamide, rubber, organic fiber, inorganic fiber, glass, and fabric. Other suitable materials are also possible.

The cellulosic paper may comprise any suitable material, including, for example, wood, cotton, kenaf, etc., or recycled materials. The polyethylene may comprise low density polyethylene, high density polyethylene, etc. One example of a polyimide may be Kapton® by DuPont, USA. The rubber may comprise synthetic rubber, natural rubber, or both. An example of the polyamide may be Nylon by DuPont, USA. Any suitable type of Nylon may be employed. The fiber may be organic or inorganic fiber. For example, the fiber may be carbon fibers, glass fibers, Kevlar®, polyethylene fibers (e.g., Tyvek® by DuPont, USA). The fabric may be, for example, silk, satin, and the like. In one example, the disposable paper liner 111 comprises a glass, including fiber glass. In one example, the disposable paper liner 111 comprises a photobase. An example of a photobase may be a commodity material sandwiched on one or both sides with a polymeric sealant—e.g., a paper substrate with extruded polyethylene on both sides.

The release layer 112 may comprise any suitable material. For example, the release layer 112 may comprise at least one of silicone, polyethylene, polypropylene, halosilicone, and polytetrafluoroethylene (e.g., Teflon™ by DuPont, USA). One example of a halosilicone is fluorosilicone. In one example, the release layer comprises a reactive chemical complex, such as Quilone®available from Zalcon, USA. In one example, the release layer of the disposable paper liner 11 comprises silicone. Other suitable materials are also possible.

The disposable paper liner 111 and a release layer 112 may each have any suitable geometry, including thickness. For example, the paper liner 111 may have a thickness of between about 50 µm and about 500 µm—e.g., between about 100 µm and about 400 µm, between about 200 µm and about 300 µm, etc. In one example, the paper liner 111 has a thickness of between about 50 µm and about 380 µm. In one example, the paper liner 111 has a thickness of between about 120 µm and about 230 µm. Other values are also possible.

The release layer 112 may have a thickness of between about 0.01 µm and about 30 µm—e.g., between about 5 µm and about 25 µm, between about 10 µm and about 20 µm, etc. Other values are also possible.

The backing layer 12 may comprise a first adhesive layer 121, an opaque polymeric film 122 disposed over the first adhesive layer; and a second adhesive layer 123 disposed over the opaque polymeric film. Each of these layers may comprise any suitable material, depending on the application. The first and second adhesive layers may comprise the same material or different materials.

The first adhesive layer 121 may comprise any suitable adhesive material, such as any suitable commercially available adhesives. For example, the first adhesive layer 121 may comprise at least one of acrylic, rubber, ethylene-vinyl acetate ("EVA"), nitrile, silicone rubber, styrene block copolymer, and vinyl ether. The rubber may comprise a natural rubber, a synthetic rubber (e.g., butyl rubber), or both. Examples of a styrene block copolymer may include poly (styrene-butadiene-styrene) ("SBS"), styrene-ethylene/butylene-styrene ("SEBS") (e.g., Kraton™ available from Kraton Polymers, USA), styrene-ethylene/propylene ("SEP"), styrene-isoprene-styrene ("SIS"), etc. Other suitable materials are also possible.

The opaque polymeric film 122 may comprise an organic material, an inorganic material, or both. The opaque polymeric film 122 need not be entirely opaque itself and may be any suitable film that create an opacifying effect for the other components of the laminate and/or resultant laminated image. The polymeric film 122 may have any suitable color. For example, the polymeric film 122 may be white. For example, the opaque polymeric film 122 may comprise at least one of opacified PET, polyethylene, polypropylene, opacified polycarbonate, cellulosic paper, and silk. An opacified PET may be pigmented PET. Examples cellulosic paper may be any of those described above. The polymeric film 122 may comprise PowerCoat™, available from Arjo Wiggins, USA, Teslin®, available from PPG Industries, USA, and/or a photobase. Other suitable materials are also possible.

The second adhesive layer 123 may comprise the same or different material from the first adhesive layer 121, such as any of those described herein.

The first adhesive layer 121, the opaque polymeric film 122, and the second adhesive layer 123 may each have any suitable geometry, including thickness. For example, the first adhesive layer 121 may have a thickness of between about 5 µm and about 80 µm—e.g., between about 10 µm and about 60 µm, between about 20 µm and about 40 µm, etc. In one example, the first adhesive layer 121 has a thickness of between about 20 µm and about 40 µm. Other values are also possible.

The opaque polymeric film 122 may have a thickness of between about 10 µm and about 200 µm—e.g., between about 25 µm and about 150 µm, between about 50 µm and about 100 µm, etc. In one example, the opaque polymeric film 122 has a thickness of between about 20 µm and about 130 µm, such as between about 25 µm and about 50 µm, etc. Other values are also possible.

The second adhesive layer 123 may have the same or different geometry, including thickness, from the first adhesive layer 121, such as any of those described herein.

The transparency 13 may have the image printed thereon. As shown in the figure, a second side of the transparency is disposed over a first side of the backing layer 12. The transparency 13 may comprise a release layer 131 on the second side, a transparent polymeric film 132 disposed over the release layer, and a top layer 133 on a first side of the transparency comprising the image and disposed over the transparent polymeric film. Referring to the figure, the first side is opposite the second side. Each of these layers may comprise any suitable material, depending on the application.

The release layer 131 may comprise the same or different material from the release layer 112, such as any of those described herein.

The transparent polymeric film 132 may comprise at least one of polyethylene terephthalate, polycarbonate, polyethylene napthalate, and polyvinyl chloride. Other suitable materials are also possible.

The top layer 133 may serve as an imaging layer. The top layer 133 may comprise any suitable material. For example, the top layer 133 may comprise at least one of silica/polyvinyl alcohol ("PVOH"), alumina/PVOH, PVOH, polyvinylpyrrolidone, polyethylene oxide, starch, diatomaceous earth, and calcium chloride. In one example, the silica/PVOH and alumina/PVOH may be in the form of porous coatings.

The release layer 131, the transparent polymeric film 132, and the top layer 133 may each have any suitable geometry, including thickness. For example, release layer 131 may have a thickness of between about 0.01 µm and about 30 µm—e.g., between about 5 µm and about 25 µm, between about 10 µm and about 20 µm, etc. The release layer 131 may have the same geometry or different geometry from the release layer 112. Other values are also possible.

The transparent polymeric film 132 may have a thickness of between about 10 µm and about 150 µm—e.g., between about 20 µm and about 100 µm, between about 40 µm and about 80 µm, etc. In one example, transparent polymeric film 132 has a thickness of between about 10 µm and about 130 µm, including between about 20 µm and about 40 µm, etc. Other values are also possible. In one example, the transparent polymeric film 132 is flexible.

The top layer 133 (or "imaging layer) may have a thickness of between about 0.1 µm and about 150 µm—e.g., between about 1 µm and about 100 µm, between about 10 µm and about 80 µm, between about 20 µm and about 60 µm, etc. In one example, the top layer 133 has a thickness of between about 20 µm and about 40 µm. Other values are also possible.

The laminate 100 as shown in FIG. 1A may undergo the methods described herein so that the image printed on the laminate 100 may be transferred onto a substrate. The laminate 100 may be the in the form that a consumer purchases from a vendor. As described below, the laminate may be disassembled and reassembled to allow the image on the laminate to be transferred onto a substrate in the form of a laminated image. The laminated image 110 to be transferred may be as shown in FIG. 1B and will be described further below.

Figure 2:
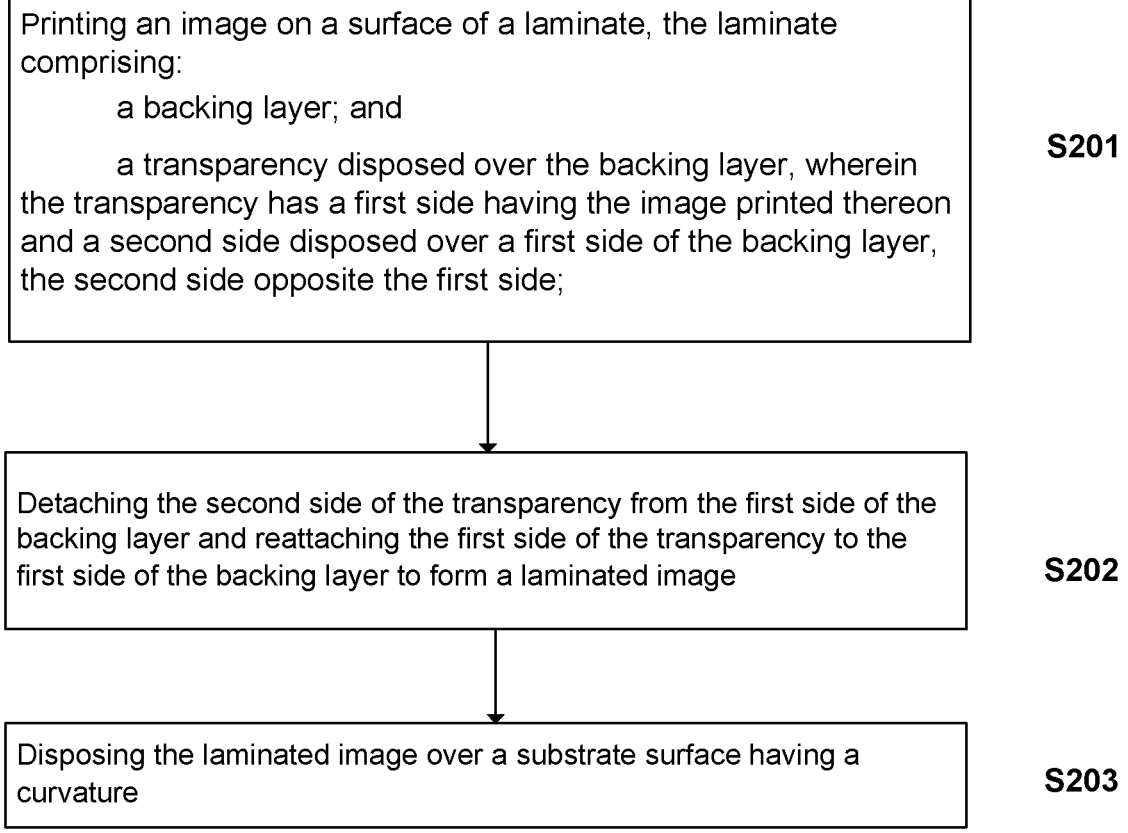
FIG. 2 shows a flowchart illustrating one example of a method described herein.

FIG. 2 illustrates an example method of transferring the image from the laminate as described herein. The method may comprise printing an image on a surface of a laminate (S201). The laminate may be any of those described herein. In one example, the laminate comprises: a backing layer and a transparency disposed over the backing layer. The transparency may have a first side having the image printed thereon and a second side disposed over a first side of the backing layer. The second side is opposite the first side. The method may comprise detaching the second side of the transparency from the first side of the backing layer and reattaching the first side of the transparency to the first side of the backing layer to form a laminated image (S202). The method may also comprise disposing the laminated image over a substrate surface having a curvature (S203). The disposing may involve attaching the adhesive layer 123 in the resultant laminated image (as shown in FIG. 1B) to the substrate surface having a curvature. The substrate may have one radius of curvature or multiple radii of curvatures at different locations.

Figure 3:
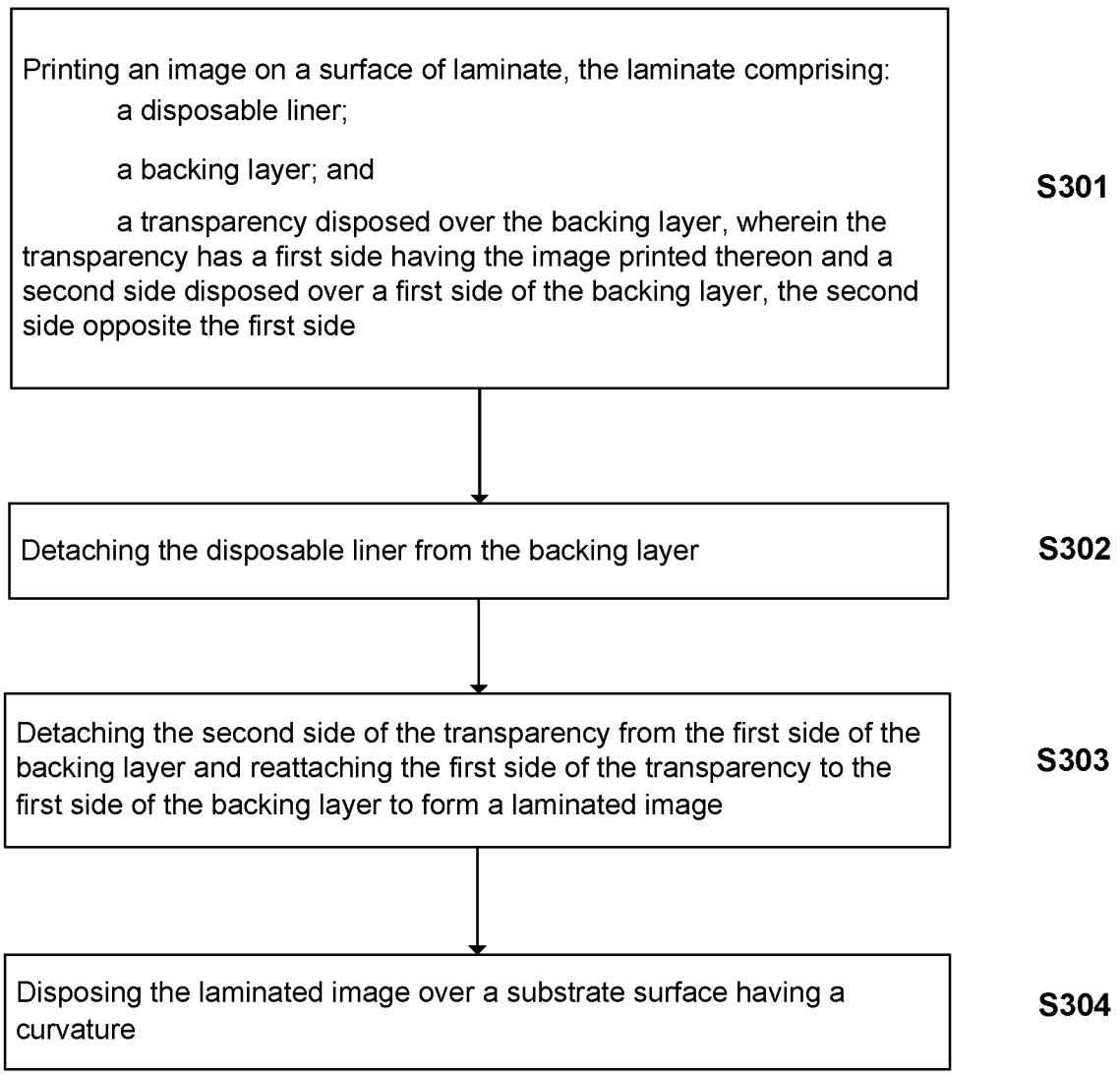
FIG. 3 shows a flowchart illustrating another example of a method described herein.

FIG. 3 illustrates another example method of transferring the image from the laminate as described herein. The method may comprise printing an image on a surface of a laminate (S301). In one example, the laminate comprises a disposable liner; a backing layer disposed over the liner; and a transparency disposed over the backing layer. The transparency may have a first side having the image printed thereon and a second side disposed over a first side of the backing layer. The second side is opposite the first side. The method may comprise detaching the disposable liner from the backing layer (S302). The method may comprise detaching the second side of the transparency from the first side of the backing layer and reattaching the first side of the transparency to the first side of the backing layer to form a laminated image (S303). The method may comprise disposing the laminated image over a substrate surface having a curvature (S304). Similar to the example method described above, the disposing may involve attaching the adhesive layer 123 123 in the resultant laminated image (as shown in FIG. 1B) to the substrate surface having a curvature. The substrate may have one radius of curvature or multiple radii of curvatures at different locations.

The resultant laminated image as transferred to the substrate may be as shown in FIG. 1B. In effect, as described in this example, the image is protected by the transparent polymeric film 132 in the resultant laminated image. The substrate over which the resultant image is disposed may be one that has a curvature.

In one example, in its initial state the laminate functions similarly to a normal sheet of inkjet photo paper. Once printed the sheet may be disassembled and reconstructed to yield an image sandwich ("laminated image") suitable for application to a substrate—e.g., (human) fingernail. Viewing the printed layer through the backside of the transparent film may produce a desirable level of gloss, gloss uniformity, and depth of image ("DOI"). In one example, one benefit of reverse-viewing through a transparent substrate is enhanced print image quality. For example, defects such as banding, coalescence, dot placement errors, etc. may be mitigated in the construction as described herein. The construction described herein may also house the image layers and adhesives behind that same film for enhanced durability. Additionally, the post-imaging reconstruction may increase safety for the user by isolating the coating(s) and ink(s) from the keratin in fingernails. In one example, the individual laminated images may be perforated, such as leaving the layout to a mobile application or an application on a desktop computer. In another example, the laminated images may be cut by a user (e.g., using scissors) for enhanced flexibility.

The methods described herein may involve additional process(es). For example, the method may further comprise prompting, such as by a machine, a user to input a parameter. In one example, the machine is a processor and/or a mobile electronic device. The method may also comprise receiving a user input as a selection of the image to be printed. For example, the user may choose the type of image to be printed from a database containing stored images. The user may also design the image to be printed. The method may also comprise forming the laminate into a geometry compatible with a geometry of the substrate. For example, the geometry, including the shape and size, of the laminate may be designed and/or optimized such that the image may be compatible with, allowing the resultant laminated image to fit onto the substrate—e.g., at least a portion of a fingernail.

The substrate over which the resultant laminated image is disposed may be any suitable substrate having a curvature as described above. For example, the substrate may be a portion of a fingernail or an entire fingernail. The "finger" may refer to any of the digits. The fingernail may be for any animals, including human. Other animals, including mammals, may also be suitable. The substrate may also be at least a portion of skin, food, or an electronic device. The substrate may also be a mechanical device, such as an automotive. The substrate may be a portion of the packaging (including housing, depending on the context) of any of the aforementioned apparatuses and devices.

An electronic device herein may refer to any device comprising at least one electrical circuit. Thus, in one example, the housing that comprises the housing structure described herein may be external to the electrical circuit. The electronic device may be a consumer electronic device. An electronic device may refer to portable/mobile electronic device. An electronic device herein may refer to a computer, a memory storage, a display, a signal transmitting device, and the like. A computer may refer to a desktop, a laptop, a tablet, a phablet, a tablone, and the like. A storage unit may refer to the hardware of a hard drive, a server, a processor, and the like. A display may refer to a monitor, a liquid crystal display ("LCD"), a television, and the like. A signal transmitting device may refer to a device transmitting any type of signal, including light, sound, and the like. In one example, the electronic device is a mobile phone.

Various examples described herein may be embodied at least in part as a non-transitory machine-readable storage medium (or multiple machine-readable storage media)—e.g., a computer memory, a floppy disc, compact disc, optical disc, magnetic tape, flash memory, circuit configuration in Field Programmable Gate Arrays or another semiconductor device, or another tangible computer storage medium or non-transitory medium) encoded with at least one machine-readable instructions that, when executed on at least one machine (e.g., a computer or another type of processor), cause at least one machine to perform methods that implement the various examples of the technology discussed herein. The computer readable medium or media may be transportable, such that the program or programs stored thereon may be loaded onto at least one computer or other processor to implement the various examples described herein.

The term "machine-readable instruction" are employed herein in a generic sense to refer to any type of machine code or set of machine-executable instructions that may be employed to cause a machine (e.g., a computer or another type of processor) to implement the various examples described herein. The machine-readable instructions may include, but not limited to, a software or a program. The machine may refer to a computer or another type of processor. Additionally, when executed to perform the methods described herein, the machine-readable instructions need not reside on a single machine, but may be distributed in a modular fashion amongst a number of different machines to implement the various examples described herein.

Machine-executable instructions may be in many forms, such as program modules, executed by at least one machine (e.g., a computer or another type of processor). Generally, program modules include routines, programs, objects, components, data structures, etc. that perform particular tasks or implement particular abstract data types. Typically, the functionality of the program modules may be combined or distributed as desired in various examples.

The printing as described herein may involve any suitable printing. For example, the printing may involve inkjet printing. The inkjet printing may be carried out by any suitable inkjet printers, such as those commercially available from HP Inc, USA. One example of inkjet printing described herein is reverse printing.

Figure 4:
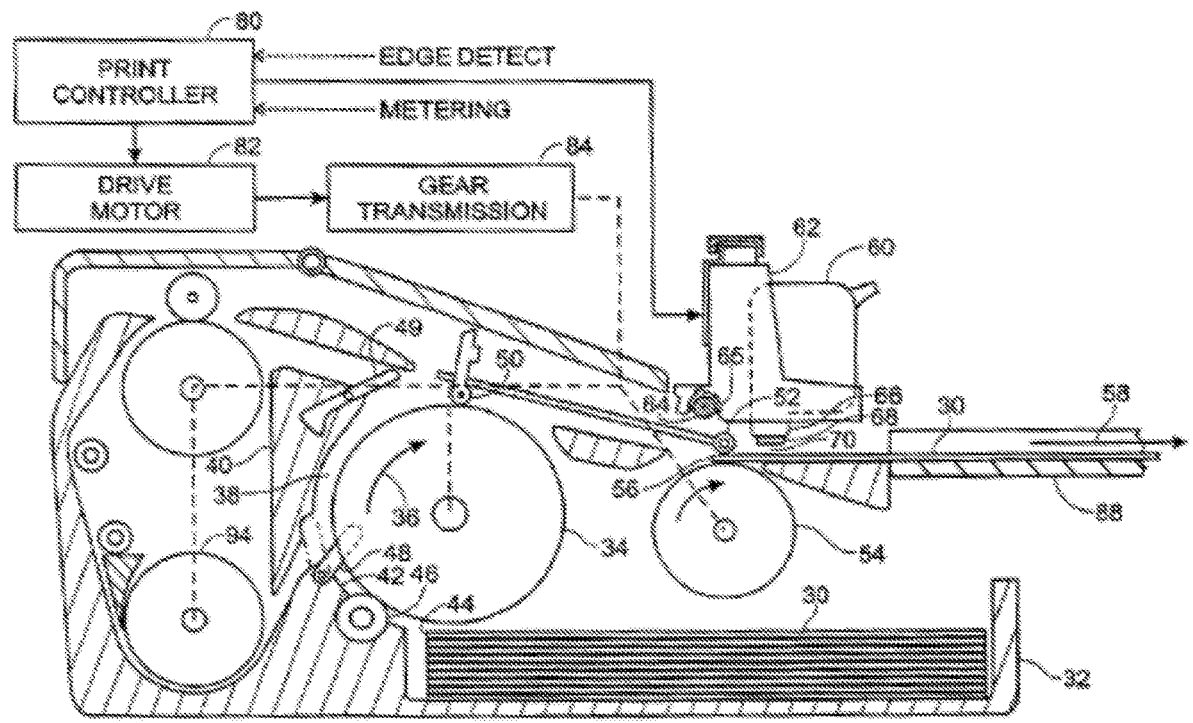
FIG. 4 is a schematic showing, in one example, some components of an inkjet printer that may be employed in the methods described herein.

FIG. 4 is a schematic showing, in one example, the primary components of an inkjet printer that, in addition to printing the image, is adapted for applying the backing layer as mentioned above. The printer includes an input tray 32 into which is stacked several sheets of transparent media 30, each sheet being the combination of the transparent base and ink-receiving coating, such as the top layer 133 as shown in FIG. 1B.

In this example, as the print operation commences, a sheet of media 30 is pulled by a pick roller 34 and directed as indicated by directional arrow 36 through a path 38 that is defined between the pick roller 34 and two guide members: a lower guide member 42 and an upper guide member 40. It is noted that although only individual rollers and guide surfaces appear in the figure, a number of such rollers and surfaces may be employed, spaced apart across the width of the media sheet (i.e., in a direction normal to the plane of FIG. 4).

Upon entering the passage 38, the leading edge 44 of the media sheet passes through the nip of an idler 46 and the pick roller 34 to contact a light weight lower gate 48. The lower gate 48 is pivotally attached at one end to the printer chassis and weighted so that it normally moves under the force of gravity into a position where its free end fits between two adjacent pick rollers 34. The contact by the leading edge 44 of the media sheet 30 may cause the gate 48 to swing open (counterclockwise in the figures) into the position shown in dashed lines of FIG. 4, thereby to permit the media sheet 30 to continue through the passage 38.

The media sheet 30 continues around the pick roller 34 and slips beneath an edge-detect roller 50, which moves slightly away from the pick roller 34 to accommodate the thickness of the media sheet. The edge-detect roller 50 carries a transducer that provides a signal to a microprocessor-based print controller 80 in response to the movement of the detector away from the pick roller 34. This edge information is saved in the controller memory.

The sheet 30 is guided into the nip of a pinch roller 52 and a feed roller 54. The feed roller 54 includes a position encoder that provides metering signals to the print controller, which signals correlate to the length of sheet 30 moved relative to the roller.

Near the pinch roller 52 there is mounted a container of ink, commonly known as an inkjet cartridge 60, for printing an image onto the coated side of the media sheet 30. The cartridge 60 is removably mounted to a carriage 62. The carriage 62 is slidable along a support rod 64 that is housed within the printer. The rod extends across the printer, oriented perpendicularly to the direction the media sheet 30 is advanced through the printer. Bushings 65 may be fit into the carriage 62 to facilitate sliding.

In one example, four cartridges 60 are employed (although only the outer one is shown in the figure) for color printing. The cartridges may contain black, cyan, yellow, and magenta inks in this example. Each cartridge 60 includes a plastic body that comprises a liquid ink reservoir shaped to have a downwardly depending snout 66. A print head 68 (the size of which is exaggerated in the drawing only for the sake of providing clarity) is attached to the end of the snout. The print head may be a thermal type, formed with minute nozzles that align with chambers of ink. Each chamber has a heat transducer in it, which is driven (heated) as needed to create a vapor bubble that ejects an ink droplet through a print zone 70 onto the sheet 30.

The cartridge 60 has a circuit mounted to it (not shown), which circuit includes exposed contacts that mate with contacts of a circuit carried inside the carriage 62. The carriage is connected, for example by a flexible, ribbon-type multi-conductor to the print controller 80, which provides to the cartridges control signals for precisely timed ejection of ink droplets. The droplets render the image on the advancing sheet 30 as the carriage 62 is reciprocated across the printer.

In another example, the method described herein may be implemented with a single cartridge containing discrete reservoirs of the four inks, wherein each ink color is channeled to a discrete nozzle set on a single print head. Also, the method may be implemented in a system that employs two interchangeable cartridges: one containing black ink and the other containing three ink colors.

In addition to controlling the ink ejection from the ink cartridge 60, the print controller 80 may provide signals suitable for controlling a drive motor 82, which, via a gear transmission 84, controls the rotational speed and direction of the rollers in the printer. In this regard, the transducer carried on the edge-detect roller 50 provides a signal to the print controller 80 in response to the movement of the detector toward the pick roller 34, which movement occurs as the trailing edge 56 of the sheet 30 passes from between those rollers 50, 54 in the feed direction shown by arrow 58. Once the trailing edge 56 of the sheet 30 is detected, the print controller may be apprised of the length of the media sheet 30 (as a result of a comparison of the metering signals corresponding to the opposing edges of the sheet) and drives the feed roller 54 by an amount sufficient to allow printing of the image to the margin of the sheet.

After the image is printed, the feed roller 54 is paused while the sheet 30 is supported, such as by edge shelves 88, to permit partial drying of the ink. After the pause, the rotational directions of the feed roller 54 and pick roller 34 are reversed to retract the sheet 30 in preparation for "painting" the printed image with the backing layer.

As a result of the processes described herein, in one example a very thin (about 20 µm) ink-receiving coating may be applied to the base. This coating may be any ink-receptive layer. In one example, the coating may comprise silica- or alumina-based microporous or nanoporous coatings with polymeric binders at a low weight %. A coating containing sol-gel is also possible. Hydrogels are also suitable as the ink-receiving coating. Coated transparent base layers as described herein may be readily available as supplies for inkjet printers. One example of such supply is that available from Hewlett-Packard Company, USA, and designated as Premium Inkjet Transparency Film, product number C3828A.

The image is printed onto the ink-receiving coating. The side of the base carrying the ink-receiving coating is designated, for the purposes of this description, as the "back" of the transparent base. In one example, the printed image is then covered with an opaque, white backing that is applied in a way to provide an intimate, gap-free bond with the ink-receiving coating. The finished print is viewed through the front of the transparent base, which, as noted, may provide a uniform, deep glossy surface for a photo-quality print. While the backing is "painted" over the ink-receiving coating, any number of mechanisms may be employed for this painting task.

One benefit of the laminated image described herein is that the transparent base and backing may protect the ink-receiving coating and make the resulting print very durable. The image may be air fast or ozone fast because the ink is sandwiched between the transparent base and the backing, thereby sealing the ink from ambient oxygen.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

What is claimed:

1. A method comprising:
   printing an image on a surface of a laminate, the laminate comprising:
      a backing layer; and
      a transparency disposed over the backing layer, wherein the transparency has a first side having the image printed thereon and a second side disposed over a first side of the backing layer, the second side opposite the first side;
   detaching the second side of the transparency from the first side of the backing layer and reattaching the first side of the transparency to the first side of the backing layer to form a laminated image; and
   disposing the laminated image over a substrate surface having a curvature.

2. The method claim 1, wherein the backing layer comprises:
   a first adhesive layer to be disposed in the laminated image over the image;
   an opaque polymeric film disposed over the first adhesive layer; and
   a second adhesive layer disposed over the opaque polymeric film and to be disposed in the laminated image over the substrate.

3. The method of claim 1, wherein the transparency comprises:
   a release layer;
   a transparent polymeric film disposed over the release layer; and
   a top layer comprising the image and disposed over the transparent polymeric film.

4. The method of claim 1, wherein printing involves inkjet printing.

5. The method of claim 1, further comprising receiving a user input as a selection of the image to be printed.

6. The method of claim 1, wherein the substrate is at least a portion of a finger nail.

7. The method of claim 1, wherein the substrate is at least a portion of food, automotive, electronic device, or a packaging of any of the foregoing.

8. A method comprising:
   printing an image on a surface of a laminate, the laminate comprising:
      a disposable liner;
      a backing layer disposed over the liner; and
      a transparency disposed over the backing layer, wherein the transparency has a first side having the image printed thereon and a second side disposed over a first side of the backing layer, the second side opposite the first side;
   detaching the disposable liner from the backing layer;
   detaching the second side of the transparency from the first side of the backing layer and reattaching the first side of the transparency to the first side of the backing layer to form a laminated image; and
   disposing the laminated image over a substrate surface having a curvature.

9. The method of claim 8, wherein the disposable liner comprises:
   a disposable paper liner; and
   a silicone release layer disposed over the paper liner.

10. The method of claim 8, wherein the disposable liner comprises at least one of cellulosic paper, polyethylene terephthalate ("PET"), polypropylene, polyethylene, polycarbonate, polyimide, polyamide, rubber, organic fiber, inorganic fiber, glass, and fabric.

11. The method of claim 8, wherein the backing layer comprises:
- a first adhesive layer to be disposed in the laminated image over the image, wherein the first adhesive layer comprises at least one of acrylic, butyl rubber, ethylene-vinyl acetate, natural rubber, nitrile, silicone rubber, styrene block copolymer, and vinyl ether;
- an opaque polymeric film disposed over the first adhesive layer, wherein the opaque polymeric film comprises at least one of opacified PET, polyethylene, polypropylene, opacified polycarbonate, cellulosic paper, and silk; and
- a second adhesive layer disposed over the opaque polymeric film and to be disposed in the laminated image over the substrate, wherein the second adhesive layer comprises at least one of acrylic, butyl rubber, ethylene-vinyl acetate, natural rubber, nitrile, silicone rubber, styrene block copolymer, and vinyl ether.

12. The method of claim 8, wherein the transparency comprises:
- a release layer, wherein the release layer comprises at least one of silicone, polyethylene, polypropylene, halosilicone, and polytetrafluoroethylene;
- a transparent polymeric film disposed over the release layer, wherein the transparent polymeric film comprises at least one of polyethylene terephthalate, polycarbonate, polyethylene napthalate, and polyvinyl chloride; and
- a top layer comprising the image and disposed over the transparent polymeric film, wherein the top layer comprises at least one of silica/polyvinyl alcohol ("PVOH"), alumina/PVOH, PVOH, polyvinylpyrrolidone, polyethylene oxide, starch, diatomaceous earth, and calcium chloride.

13. The method of claim 8, where the substrate is at least a portion of finger nail, food, electronic device, automotive, or a packaging of any of the foregoing.

14. The method of claim 8, further comprising forming the laminate into a geometry compatible with a geometry of the substrate.

* * * * *